Patented Oct. 16, 1945

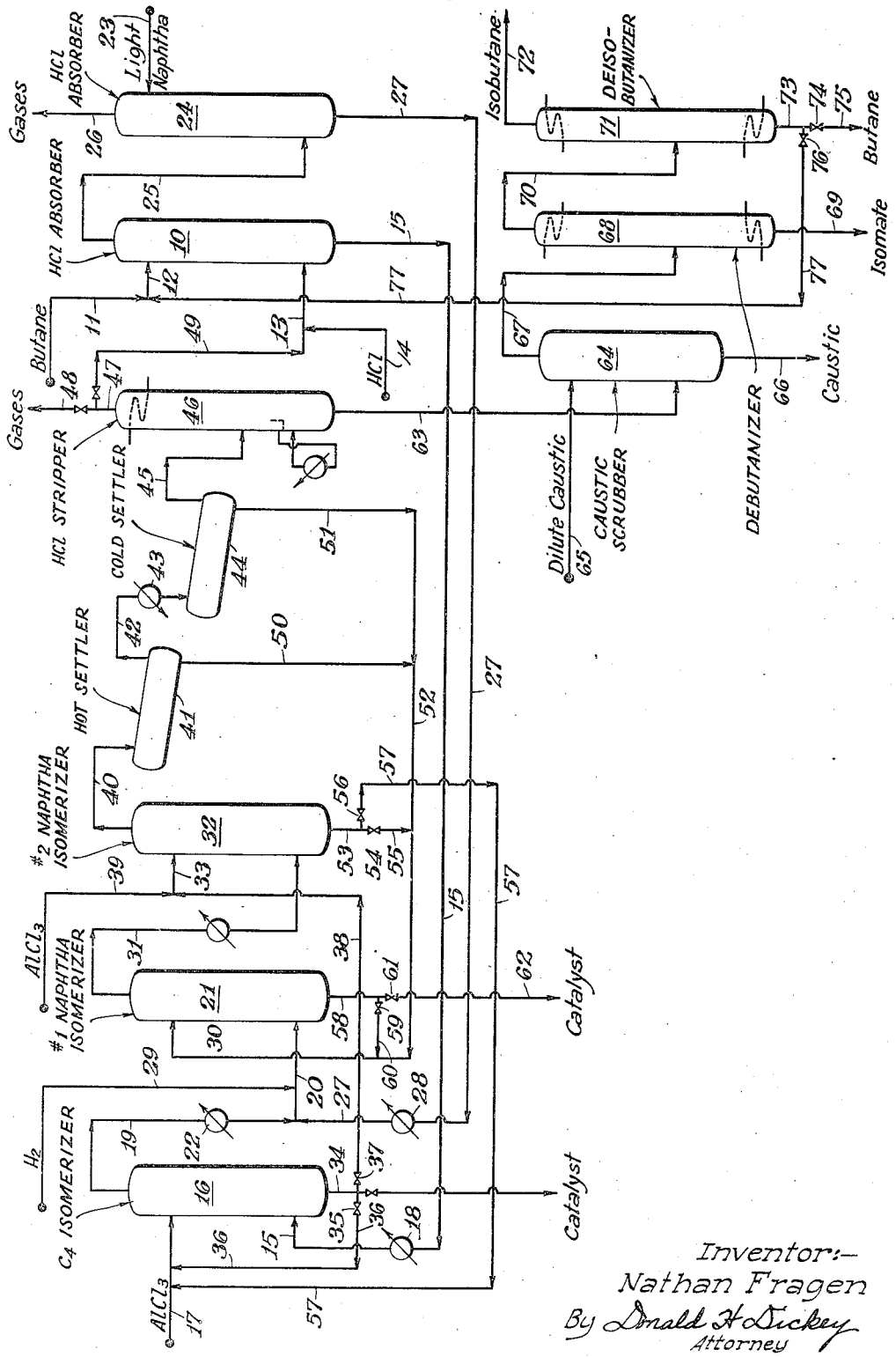

2,386,784

UNITED STATES PATENT OFFICE 2,386,784

ISOMERIZATION

Nathan Fragen, Hammond, Ind., assignor to Standard Oil Company, Chicago, Ill., a corporation of Indiana Application September 30, 1942, Serial No. 460,227

5 Claims. (Cl. 260—683.5)

This invention relates to the isomerization of hydrocarbons and it pertains more particularly to an improved unitary system for the conversion of straight-chain and slightly branched-chain paraffinic hydrocarbons to more highly branched-chain paraffinic hydrocarbons.

The isomerization of paraffinic hydrocarbons in the presence of aluminum halide catalysts, such as aluminum chloride, aluminum bromide and their hydrocarbon complexes, either as such or supported on solid materials, is well known. The reaction is promoted by the addition of a hydrogen halide such as hydrogen chloride or hydrogen bromide or a substance affording a hydrogen halide under reaction conditions. In the isomerization of normally liquid hydrocarbons it has been found advantageous to carry out the process under hydrogen pressures since the hydrogen together with the hydrogen halide appears not only to help prolong the catalyst life but the hydrogen also appears to repress the tendency of the hydrocarbons to crack under the reaction conditions. Isobutane is produced as a by-product of the isomerization of normally liquid paraffinic hydrocarbons particularly if the reaction is carried out under rather severe conditions but if normal butane is included with the low-boiling naphthas there is substantially no conversion of the normal butane to isobutane in the system.

It is an object of this invention to provide an improved process for the production of isobutane and high octane number naphthas suitable for use in aviation fuels. Another object of this invention is to provide a unitary process for the conversion of $C_4$ to $C_6$ hydrocarbons to their isomers with good yields and with good catalyst life. A further object of this invention is to provide a unitary system for the conversion of paraffinic hydrocarbons with optimum yield of product and economical use of catalyst. Further objects and advantages will become apparent as the description of my process proceeds, particularly when read in conjunction with the accompanying drawing which is a simplified flow diagram of one embodiment of a system suitable for carrying out my invention.

In brief, I contemplate the isomerization of normal butane to isobutane in the presence of an aluminum halide-hydrocarbon complex isomerization catalyst and the inclusion of the reaction product in a light naphtha isomerization reactor together with a flow of catalyst from the butane isomerizer to the naphtha isomerizer.

Referring now to the drawing, a butane stream from a source (not shown) enters absorber 10 via lines 11 and 12. The butane may be a substantially pure butane fraction or it may be a mixture of normal and isobutanes. It should be substantially free of olefins and diolefins. A suitable source of such material is from the debutanization of virgin gasoline or naphtha stocks, a $C_4$-cut from the fractionation of gasoline from natural gas or distillate type wells, or with equal suitability it may be the olefin-free off gases from an alkylation reactor or a polymerization reactor. Hydrogen chloride enters absorber 10 via line 13. This hydrogen chloride is most suitably recovered from the system by stripping in a process to be described hereinafter, and can be supplemented or supplanted by fresh hydrogen chloride from line 14. Absorber 10 is maintained with a top temperature of about 100° F. and a bottom temperature of about 115° F. and at a pressure in the vicinity of about 280 pounds per square inch. The amount of hydrogen chloride dissolved should be within the approximate range of about 5 to about 30 pounds of hydrogen chloride per barrel of total butane stream charged, usually within the general vicinity of about 10 pounds per barrel. Since only a small part of hydrogen chloride is actually consumed, the major portion of it can be recovered and reintroduced into the system.

The butane containing dissolved hydrogen chloride is withdrawn from absorber 10 by line 15 and directed to isomerizer 16 wherein it is contacted with aluminum chloride. The catalyst can be anhydrous aluminum chloride from any suitable source introduced through line 17 or it may comprise fresh aluminum chloride admixed with the aluminum chloride complex from the naphtha isomerizer. Isomerizer 16 can conveniently be a reactor in the form of an elongated tower topped by a comparatively wide section or it may be a combination of an elongated tower and a separate settling drum. Other types of isomerization reactors, such as those having mechanical mixing means therein, or comprising elongated coils, can be used if desired. Preferably, if the tower-type reactor is employed, a considerable portion of the tower is filled with the catalyst, so that a deep bed or pool is present. A pool at least 4 feet deep and preferably more than 10 feet deep is desirable in commercial operations.

The isomerization reaction in isomerizer 16 is carried out at temperatures within the approximate range of 120° F. to 400° F., preferably at about 200° F. to 300° F., for example at about 225° F. to 250° F. Heat can be supplied by passing the butane and hydrogen chloride solution through heater 18 in line 15 and/or by the use of a heating jacket or other heating means about the tower. The reaction is preferably carried out with the reactants in the liquid phase and the pressure can be within the approximate range of about 100 to about 2000 pounds per square inch, depending to a large extent upon the temperature at which the reactor is maintained. The preferred pressure will be within the approximate range of 500 to 1000 pounds per square inch.

The hydrocarbons together with any remaining dissolved hydrogen chloride and any dissolved or occluded catalyst passes overhead from isomerizer 16 through line 19 and line 20 to naphtha isomerizer 21. Temperature regulating means 22 can be inserted in line 19 to control the temperature of the feed stream to naphtha isomerizer 21.

A light naphtha stream is introduced into the system via line 23. This naphtha charge will consist essentially of $C_5$ and $C_6$ paraffinic hydrocarbons. It may contain naphthenes to an extent within the approximate range of 5 to 15%, small amounts of naphthenes being desirable to suppress cracking and it is possible to include various amounts of butanes if necessary since these will be recovered in a later fractionating system and directed to the butane isomerization reactor for conversion to isobutanes. The stock should be substantially olefin-free and should contain only very minor amounts, if any, of aromatic hydrocarbons. A virgin light naphtha stream from fractionation of straight-run gasoline or a debutanized fraction having a 90% boiling point of approximately 155° F. from crude oil, natural gas or distillate wells are particularly suitable. Such stocks are of relatively low octane number and consist chiefly of normal pentane, normal hexane and methyl pentanes. The off gases from absorber 18 containing unabsorbed hydrogen chloride enter absorber 24 near the base via line 25 while the light naphtha fraction is introduced at a point near the upper portion of absorber 24. Absorber 24 is maintained with a bottom temperature of approximately 110° F. and a top temperature of about 90° F. and is operated at a pressure of about 285 pounds per square inch. The hydrogen chloride is absorbed from the gases so that substantially hydrogen chloride-free gases are vented from the top of absorber 24 via line 26. These gases will consist chiefly of hydrogen but may contain methane and other impurities. The hydrogen chloride absorbed in the naphtha in absorber 24 should be sufficient so that when the light naphtha stream is combined with the butane stream from isomerizer 16 the amount of hydrogen chloride in the stock entering isomerizer 21 will be within the approximate range of 2 to 10% and preferably within the general vicinity of about 5% by weight based on the total hydrocarbons charged to isomerizer 21.

The hydrogen chloride-enriched naphtha is withdrawn from absorber 24 via line 27 and directed to isomerizer 21 through line 20. The feed stream may be heated by heater 28 in line 27. Hydrogen is introduced into isomerizer 21 from any suitable source via line 29 which joins line 20 and is commingled with the other feed streams. Usually from about 100 to about 300, for example about 200, cubic feet of hydrogen per barrel of naphtha charged to the reactor 21 is employed. Aluminum chloride complex, preferably from a succeeding naphtha isomerizer, is introduced into isomerizer 21 through line 30. Isomerizer 21 can be of the tower type previously described or any other suitable reactor vessel for obtaining intimate contact of the reacting materials and catalysts. Isomerizer 21 is preferably maintained at a temperature within the approximate range of about 250° F. to 330° F. and under pressures of about 850 pounds per square inch. These particular operating conditions are not limiting, however, since pressures within the general vicinity of 500 to 1500 pounds per square inch can be used and the temperature range may be from about 100 to 350° F. or higher. If a tower-type reactor is employed the feed streams bubble up through the column of liquid complex and pass overhead through line 31 to the base of naphtha isomerizer 32, the hydrogen chloride and hydrogen, of course, being included. Naphtha isomerizer 32 is maintained at substantially the same pressure but slightly lower temperature than that prevailing in reactor 21. For example, if a temperature of 275° F. is maintained in reactor 21, then the temperature in reactor 32 may be approximately 225° F. Catalyst is introduced into isomerizer 32 via line 33 and while it is possible to use fresh aluminum chloride or an aluminum chloride hydrocarbon complex, such as that obtained by contacting commercial isooctane with anhydrous aluminum chloride and hydrogen chloride at approximately 120 to 140° F. and at atmospheric pressure. I prefer to employ the catalyst from butane isomerizer 16. The catalyst is withdrawn from butane isomerizer 16 via line 34 and a portion of it can be recycled by opening valve 35 in line 36 which rejoins line 17 while the remainder is directed to isomerizer 32 by opening valve 37 in line 38 which joins line 33. If necessary in order to obtain desirable catalyst activity in the naphtha isomerizer 32, additional aluminum chloride or aluminum chloride hydrocarbon complex can be added via line 39.

After the liquid and gaseous charging stocks bubble through the catalyst pool in isomerizer 32 they pass overhead through line 40 and are introduced into hot settler 41 from which settled catalyst can be recovered. The products from hot settler 41 pass through line 42 and cooler 43 to cold settler 44 which is maintained at about atmospheric temperature up to about 100° F. The liquid products and gases are withdrawn from settler 44 via line 45 and introduced into hydrogen chloride stripper 46 which can be operated at a pressure of about 290 pounds per square inch with a top temperature of approximately 140° F. and a bottom temperature such that essentially all of the butanes will leave the bottom of the stripper. Suitable bottom heating and tower top temperature controls can be employed to maintain the desired conditions therein. The gaseous constituents will include hydrogen and hydrogen chloride as well as any normally gaseous low molecular weight hydrocarbons formed during the reaction or present as an impurity in the hydrogen. These pass overhead from hydrogen chloride stripper 46 via line 47 and can be discarded through line 48 but preferably are directed to absorber 18 via line 49 which joins line 13 whereby the hydrogen chloride is recovered by absorption in the incoming fresh feed stocks.

Catalyst is withdrawn from hot settler 41 via line 50 and from cold settler 44 by line 51 and is then directed via line 52 to line 30 leading to naphtha isomerizer 21. In addition, catalyst is withdrawn from the base of naphtha isomerizer 32 via line 53 and all or a portion of it can be directed to isomerizer 21 by opening valve 54 in line 55 which joins line 52. However, it is usually desirable to employ a part of the catalyst from isomerizer 32 in butane isomerizer 16 and a portion thereof can be withdrawn from line 53 by opening valve 56 in line 57 which leads to line 17. Catalyst from naphtha isomerizer 21 is withdrawn via line 58 and can be recycled by opening valve 59 in line 60 which joins line 30. Since this catalyst will be substantially spent it is usually preferable to recycle only a portion of the withdrawn catalyst and to discard the remainder by opening valve 61 in line 62.

The hydrocarbons from the reaction steps, substantially hydrogen chloride-free, are withdrawn from hydrogen chloride stripper 46 by line 63 and are scrubbed in caustic scrubber 64 to remove any final traces of acid and/or catalyst. Dilute caustic solution is introduced through line 65 to caustic scrubber 64 and withdrawn therefrom by line 66. The washed hydrocarbons pass overhead through line 67 to debutanizer 68 which is provided with heating means for maintaining a bottom temperature of about 240° F. Debutanizer 68 is operated at a pressure of approximately 75 pounds per square inch gauge and conventional top cooling, such as a reflux, can be employed to maintain a top temperature of about 125° F. The liquid isomate of high octane number and rich in neohexane is withdrawn through line 69 for use as aviation fuel or as a constituent thereof. The C4 gases pass overhead via line 70 to fractionator 71 in which a separation is made between the normal butane and the isobutane, the isobutane being withdrawn by line 72. Fractionator 71 is maintained with a bottom temperature of approximately 158° F. and a top temperature of about 135° F. at a pressure of approximately 105 pounds per square inch. Conventional heating and reflux means can be employed for the maintenance of these operating conditions. The normal butane is withdrawn from fractionator 71 through line 73 and while it is possible to discard it by opening valve 74 in line 75 it is preferable that it be recycled to the system by opening valve 76 in line 77 which leads to line 12 entering absorber 10 and supplements the fresh butane entering through line 11.

In the operation of my unitary system, butane is used to scrub at least a part of the hydrogen chloride from the off gases obtained by stripping the products from a naphtha isomerization step and the hydrogen chloride-laden butane is then subjected to isomerization conditions in the presence of a fresh aluminum chloride catalyst. The butane with excess hydrogen chloride passes directly to the first stage of a naphtha isomerization system. A C5—C6 paraffinic naphtha cut is used to scrub the off gases from the butane-hydrogen chloride absorber system to substantially clean up any remaining hydrogen chloride and directed therefrom to the same first stage naphtha isomerization reactor with the isomerized butane product stream. Hydrogen is injected into the first naphtha isomerization reactor and the products therefrom pass to a second isomerization reactor which may be maintained at a lower temperature, thereby permitting an even higher octane number product to be obtained. The catalyst from the butane isomerizer is withdrawn and directed to the second stage naphtha isomerizer and thence to the first stage naphtha isomerizer. If desired, a portion of the complex from the second stage naphtha isomerizer can be returned to the butane isomerizer where it is admixed with fresh aluminum chloride for promoting the reaction therein. The butane and light naphtha products from the second stage isomerization reactor after being stripped of hydrogen chloride (which is absorbed by the fresh feed streams in the manner previously described) is neutralized and fractionated, an isomate fraction suitable for use as aviation fuel being recovered as one product and isobutane being recovered as another product, with recycle of the normal butane, preferably through the hydrogen chloride absorber to the butane isomerizer.

By thus carrying out my process quantities of isobutane are obtained which would not be possible if the normal butane were subjected to the reaction conditions favorable for the conversion of the light naphtha stream and in conjunction with such a stream. The addition of the isobutane to the naphtha isomerization step, however, "buffers" the isomerization reaction so that the degradation of the feed stock to hydrocarbons lower boiling than are desirable in aviation products is substantially prohibited and there is less loss of aviation fuel material. Moreover, by utilizing the catalyst from the butane isomerization in the naphtha isomerization steps a much greater catalyst life is obtained since under the reaction conditions for the liquid hydrocarbon feed stock and particularly in the presence of hydrogen the catalyst from the butane isomerization is at least partially regenerated while it converts additional quantities of C5—C6 hydrocarbons to high octane number aviation fuels. The scrubbing system herein described for recovery of hydrogen chloride is a particularly advantageous method of recovering hydrogen chloride. The process is economical in operation due to the fact that most of the operations are carried out with not too great differences in temperature so that elaborate heating and cooling means can be eliminated. Moreover, a single fractionation system is sufficient for the recovery of the desired hydrocarbon streams and the recycle of unconverted normal butane to the system.

Although I have shown one preferred embodiment of my invention, this is primarily by way of illustration and not by way of limitation, and I do not intend to be limited thereby but only as set forth in the appended claims. Moreover, many details have been omitted from the drawing and description in the interests of simplicity and clarity, as for example, compressors, pumps, valves, automatic control devices, heat exchangers, reflux drums, etc., all of which are well known in the art and will be readily supplied by one wishing to practice my invention.

I claim:

1. An isomerization process which comprises contacting normal butane with a liquid aluminum chloride-hydrocarbon complex catalyst and hydrogen chloride under isomerization conditions and in the absence of added hydrogen in a first contacting step to produce an effluent product stream containing isobutane and hydrogen chloride, contacting the effluent product stream from the first contacting step and a relatively low octane number paraffinic hydrocarbon of the pentane-hexane boiling range with a liquid aluminum chloride-hydrocarbon complex under isomerization conditions in the presence of added hydrogen in a second contacting step, adding high activity aluminum chloride catalyst material to the first contacting step for maintaining the activity of the catalyst complex therein, and transferring relatively inactive catalyst complex from said first contacting step to said second contacting step whereby said transferred catalyst complex is at least partially regenerated with the added hydrogen and whereby it simultaneously catalyzes the isomerization of the low octane number paraffinic hydrocarbon in the second contacting step.

2. The process of claim 1 wherein at least a part of the high activity aluminum chloride catalyst material introduced into the first contacting step is active catalyst complex from the second contacting step.

3. The method of controlling catalyst activity in a process wherein normal butane is isomerized with a liquid aluminum chloride-hydrocarbon complex catalyst and hydrogen chloride in the absence of added hydrogen, and a normally liquid relatively low octane number paraffinic hydrocarbon lower boiling than heptane is isomerized with a liquid aluminum chloride-hydrocarbon complex catalyst and hydrogen chloride in the presence of added hydrogen, which method comprises producing a partially spent liquid aluminum chloride-hydrocarbon complex by isomerizing normal butane with said complex in the absence of added hydrogen, increasing the activity of the partially spent liquid aluminum chloride-hydrocarbon complex by contacting it with hydrogen chloride and added hydrogen while effecting the isomerization of said normally liquid hydrocarbons, and subsequently isomerizing further amounts of normal butane with said catalyst of increased activity in the absence of added hydrogen.

4. In a process wherein normal butane is isomerized in a first isomerization zone with a liquid aluminum chloride-hydrocarbon complex and hydrogen chloride under isomerization conditions in the absence of added hydrogen, and a normally liquid relatively low octane number paraffinic hydrocarbon lower boiling than heptane is isomerized in a second isomerization zone with said catalyst and hydrogen chloride under isomerization conditions in the presence of added hydrogen, the method of operation which comprises introducing a complex catalyst which has become partially spent in the isomerization of normal butane from the first zone to the second zone, increasing the activity of said complex in said second zone simultaneously with the isomerization of normally liquid hydrocarbon and returning complex of increased activity from said second zone to said first zone for further butane isomerization.

5. An isomerization process which comprises contacting normal butane containing dissolved hydrogen chloride with a liquid aluminum chloride-hydrocarbon complex catalyst under isomerization conditions in the absence of added hydrogen in a first contacting zone, contacting the effluent product stream from the first contacting zone and relatively low octane number paraffinic hydrocarbons of the pentane to hexane boiling range with a liquid aluminum chloride-hydrocarbon complex under isomerization conditions and in the presence of added hydrogen in a second contacting zone, removing catalyst complex from the effluent product stream leaving the second contacting zone, then stripping said effluent product stream to remove fixed gases containing hydrogen chloride therefrom, absorbing hydrogen chloride from said fixed gases in the normal butane in a first absorption zone for obtaining said normal butane containing dissolved hydrogen chloride, scrubbing the gases leaving said first absorption zone with said relatively low octane number paraffinic hydrocarbon of the pentane to hexane boiling range in a second absorption zone for recovering additional hydrogen chloride, venting undissolved gases from the top of the second absorption zone, and utilizing said recovered additional hydrogen chloride as a catalyst promoter in said second contacting zone.

NATHAN FRAGEN.